(12) United States Patent
Adachi

(10) Patent No.: US 8,363,539 B2
(45) Date of Patent: Jan. 29, 2013

(54) OFDM RECEIVER AND OFDM RECEIVING METHOD

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 537 days.

(21) Appl. No.: 12/346,450

(22) Filed: Dec. 30, 2008

(65) Prior Publication Data

US 2009/0285086 A1    Nov. 19, 2009

(30) Foreign Application Priority Data

May 15, 2008   (JP) ................. 2008-128468

(51) Int. Cl.
*H04J 11/00* (2006.01)
(52) U.S. Cl. .................................. 370/210
(58) Field of Classification Search .......... 370/210; 375/260, 267, 330, 340
See application file for complete search history.

(56) References Cited

U.S. PATENT DOCUMENTS

| | | | | |
|---|---|---|---|---|
| 7,020,116 B1* | 3/2006 | Nakada | ............... | 370/338 |
| 2004/0091057 A1* | 5/2004 | Yoshida | ............... | 375/260 |
| 2005/0100109 A1* | 5/2005 | Nagata et al. | ............... | 375/260 |
| 2005/0213680 A1* | 9/2005 | Atungsiri et al. | ............... | 375/260 |
| 2007/0274406 A1* | 11/2007 | Adachi | ............... | 375/260 |
| 2007/0280364 A1 | 12/2007 | Adachi | | |
| 2009/0274038 A1* | 11/2009 | Takeuchi et al. | ............... | 375/260 |

FOREIGN PATENT DOCUMENTS

| | | |
|---|---|---|
| JP | 11-163822 | 6/1999 |
| JP | 2001-292125 A | 10/2001 |
| JP | 2004-032030 | 1/2004 |
| JP | 2004-096187 A | 3/2004 |
| JP | 2004-153831 | 5/2004 |
| JP | 2004-304618 A | 10/2004 |
| JP | 2006-311385 A | 11/2006 |
| JP | 2007-318315 A | 12/2007 |
| JP | 2007-324905 A | 12/2007 |
| KR | 10-2007-113089 | 11/2007 |
| KR | 10-2007-115570 | 12/2007 |
| WO | WO 2006/087856 A1 | 8/2006 |

OTHER PUBLICATIONS

Office Action issued to JP Application No. 2008-128468, issued Jun. 19, 2012.
Notice of Rejection Grounds issued Nov. 13, 2012, in counterpart Japanese Patent Application No. 0741278, 8pp (including English translation).

* cited by examiner

*Primary Examiner* — Sai-Ming Chan
(74) *Attorney, Agent, or Firm* — Arent Fox LLP

(57) ABSTRACT

An FFT unit generates a frequency domain signal by converting an OFDM signal using Fourier transform. A delay amount calculation unit generates a delay profile of the OFDM signal. The control determination unit detects a main wave and an interference wave using the delay profile. When the time difference between the main wave and a preceding wave is larger than a guard interval of the OFDM signal, an FFT window control unit sets the start position of the FFT window at a position shifted forward from the symbol start position of the main wave by an amount corresponding to the guard interval.

19 Claims, 17 Drawing Sheets

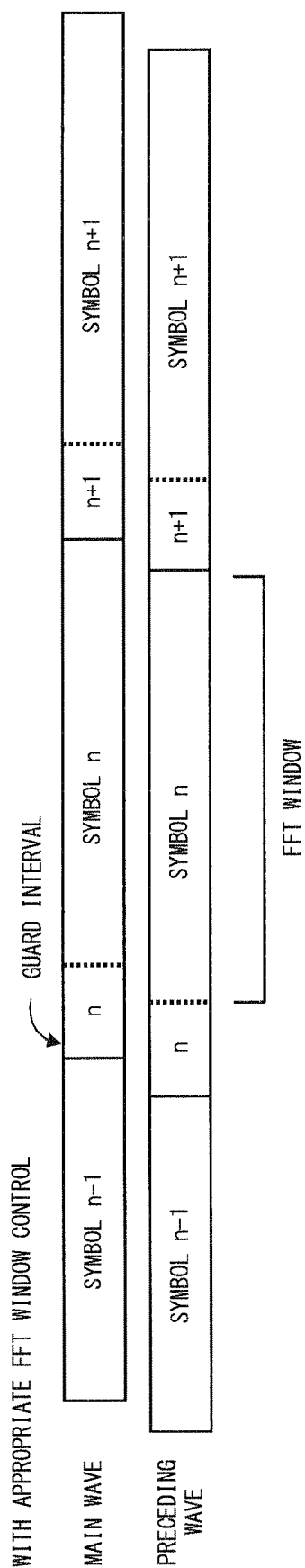
F I G. 3B

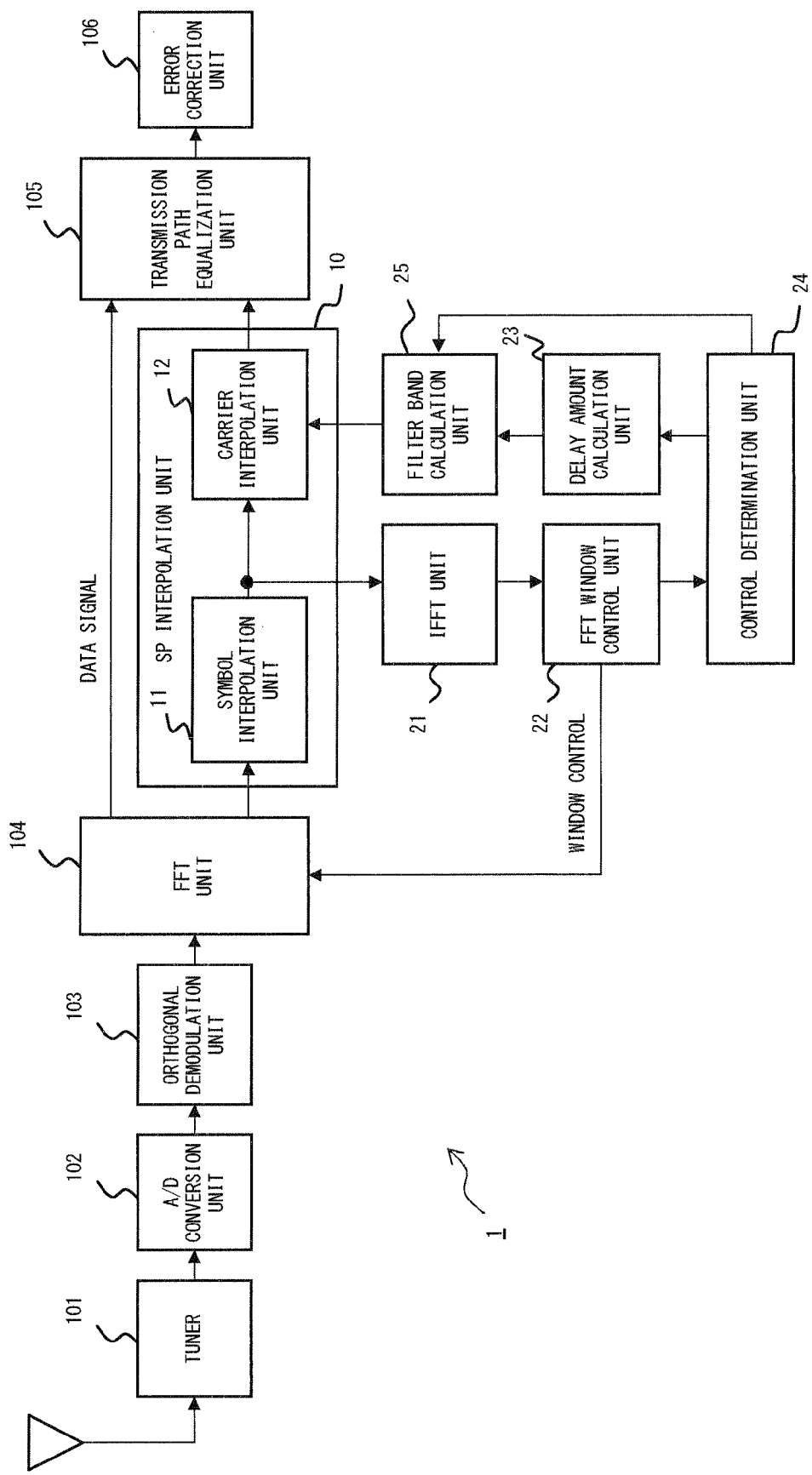
F I G. 6

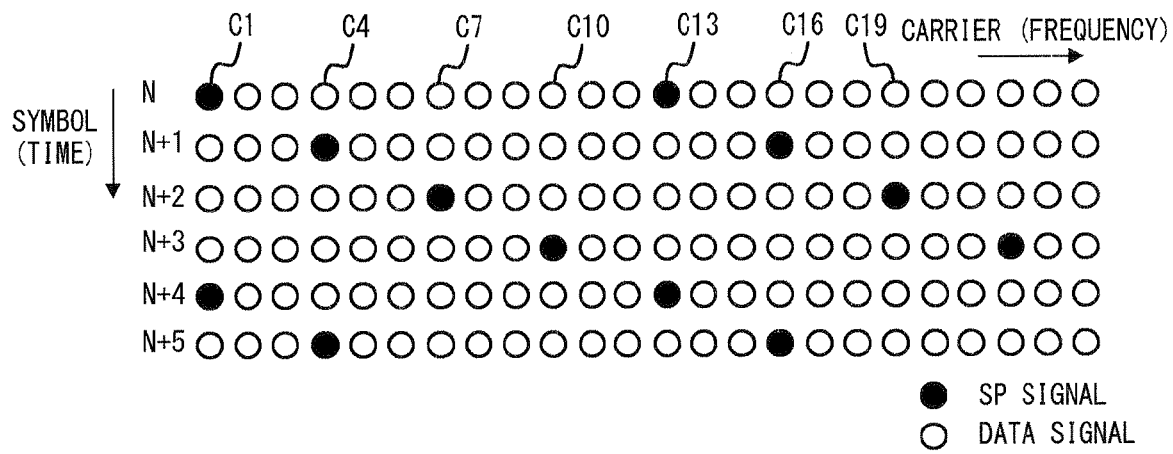
F I G. 7

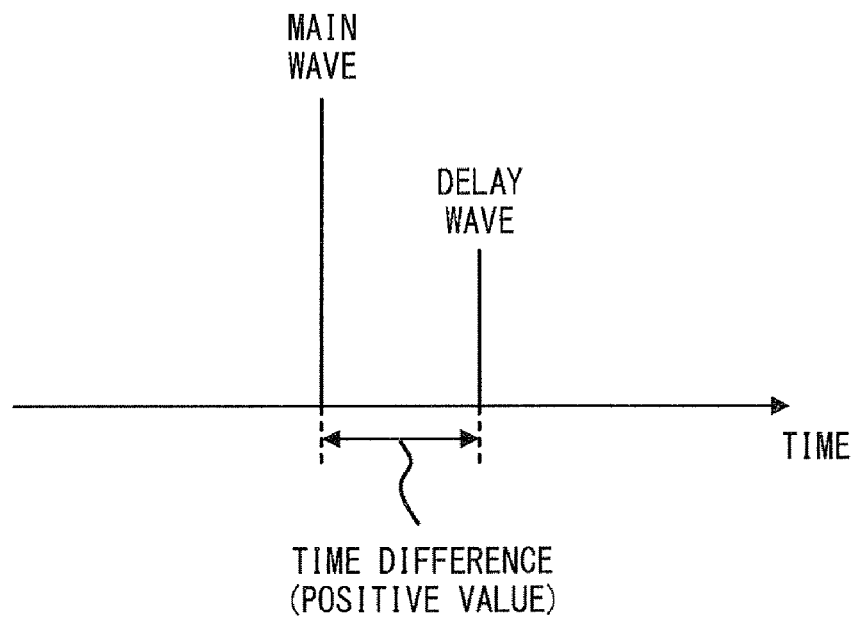
F I G. 9 A
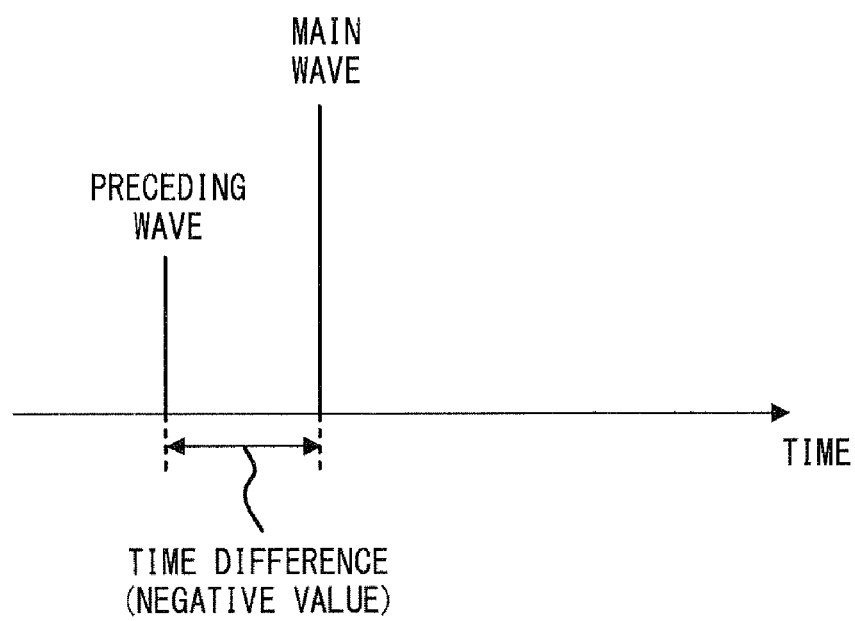
F I G. 9 B

| | WINDOW POSITION | FILTER BAND ON POSITIVE SIDE | FILTER BAND ON NEGATIVE SIDE |
|---|---|---|---|
| DELAY WAVE | ADJUSTED TO MAIN WAVE | EXPANDED TO INCLUDE DELAY WAVE | NOT EXPANDED |
| PRECEDING WAVE WITHIN GUARD PERIOD | ADJUSTED TO PRECEDING WAVE | EXPANDED TO INCLUDE MAIN WAVE | NOT EXPANDED |
| PRECEDING WAVE EXCEEDING GUARD PERIOD | ADJUSTED TO POSITION SHIFTED FORWARD FROM MAIN WAVE BY AMOUNT CORRESPONDING TO GUARD PERIOD | EXPANDED TO INCLUDE MAIN WAVE (GUARD PERIOD) | EXPANDED TO INCLUDE PRECEDING WAVE |

FIG. 12

| TIME DIFFERENCE (MULTIPATH DELAY) | FILTER COEFFICIENT |
|---|---|
| 200 | $C1_{(200)}$, $C2_{(200)}$, $C3_{(200)}$, $\cdots$ $Cn_{(200)}$ |
| 190 | $C1_{(190)}$, $C2_{(190)}$, $C3_{(190)}$, $\cdots$ $Cn_{(190)}$ |
| 180 | $C1_{(180)}$, $C2_{(180)}$, $C3_{(180)}$, $\cdots$ $Cn_{(180)}$ |
| $\vdots$ | $\vdots$ |
| 20 | $C1_{(20)}$, $C2_{(20)}$, $C3_{(20)}$, $\cdots$ $Cn_{(20)}$ |
| 10 | $C1_{(10)}$, $C2_{(10)}$, $C3_{(10)}$, $\cdots$ $Cn_{(10)}$ |
| 0 | $C1_{(0)}$, $C2_{(0)}$, $C3_{(0)}$, $\cdots$ $Cn_{(0)}$ |
| -10 | $C1_{(-10)}$, $C2_{(-10)}$, $C3_{(-10)}$, $\cdots$ $Cn_{(-10)}$ |
| -20 | $C1_{(-20)}$, $C2_{(-20)}$, $C3_{(-20)}$, $\cdots$ $Cn_{(-20)}$ |
| $\vdots$ | $\vdots$ |
| -180 | $C1_{(-180)}$, $C2_{(-180)}$, $C3_{(-180)}$, $\cdots$ $Cn_{(-180)}$ |
| -190 | $C1_{(-190)}$, $C2_{(-190)}$, $C3_{(-190)}$, $\cdots$ $Cn_{(-190)}$ |
| -200 | $C1_{(-200)}$, $C2_{(-200)}$, $C3_{(-200)}$, $\cdots$ $Cn_{(-200)}$ |

FIG. 13

OFDM RECEIVER AND OFDM RECEIVING METHOD

CROSS REFERENCE TO RELATED APPLICATION

This application is based upon and claims the benefit of priority of the prior Japanese Patent Application No. 2008-128468, filed on May 15, 2008, the entire contents of which are incorporated herein by reference.

FIELD

The present invention relates to an OFDM receiver and an OFDM receiving method for receiving an OFDM signal, which may be applied to, for example, a digital broadcast receiver receiving digital broadcast that uses OFDM.

BACKGROUND

In a digital modulation method that uses one carrier wave (hereinafter referred to as "carrier"), the symbol period generally becomes shorter as the transmission rate increases. Under a multipath environment, this may lead to difficulty in demodulating a signal. The multipath refers to an environment in which a radio wave transmitted from a transmitting station arrives at a receiving station via a plurality of paths, which occurs due to reflection on an obstacle and the like. The similar environment as the multipath environment also occurs in a communication system in which a plurality of transmitting stations (or relay stations) transmit radio waves that carry the same signal. In the description below, a "multipath environment" refers to both of the above environments.

OFDM (Orthogonal Frequency Division Multiplexing) system has been proposed as a transmission system to improve the reception performance under a multipath environment. In the OFDM system, data are transmitted employing a plurality of carriers that are orthogonal to each other on the frequency axis. For this reason, the symbol period of data transmitted using each of the carriers is longer according to the OFDM system, resulting in less degradation of reception performance even under a multipath environment with large delays. In addition, a different demodulation method can be selected for each of the carriers.

According to the OFDM system, the transmitting station performs modulation using IFFT (Inverse Fast Fourier Transform), and the receiving station performs demodulation using FFT (Fast Fourier Transform). Therefore, the OFDM system has high frequency efficiency, and its application to digital terrestrial broadcasts has been widely explored. In Japan, ISDB-T (Integrated Services Digital Broadcasting-Terrestrial), a digital terrestrial broadcast standard, has adopted the OFDM.

FIG. 1 is a diagram illustrating the configuration of an embodiment of an OFDM receiver used in a digital broadcast system. In FIG. 1, an OFDM signal is received by a tuner 101 and converted into a digital signal by an A/D conversion unit 102. An orthogonal demodulation unit 103 generates an orthogonal signal from the digital signal obtained by the A/D conversion unit 102. The orthogonal signal is a complex digital data stream representing an I component and a Q component. An FFT unit 104 performs Fourier transform (that is, FFT) for each symbol of the orthogonal signal obtained by the orthogonal demodulation unit 103. A time domain signal is converted into a frequency domain signal by the FFT. The frequency signal contains a data signal and a scattered pilot (SP) signal that are transmitted using carriers having different frequencies from each other. A transmission path equalization unit 105 corrects phase rotation occurring in the transmission path. An error correction unit 106 performs error correction and recovers the transmitted data.

An IFFT unit 107 converts the SP signal contained in the frequency domain signal output from the FFT unit 104 into the time domain signal. A delay information extraction unit 108 generates a delay profile as delay information, on the basis of the time domain signal output from the IFFT unit 107. The delay profile represents the variation of the reception power on the time axis. The delay information extraction unit 108 also generates an FFT window control instruction to instruct the position of the FFT window (that is, the calculation range of the FFT) and provide it to the FFT unit 104. The FFT unit 104 performs FFT for each symbol in accordance with the FFT window control instruction.

According to the OFDM system, a guard interval is introduced in order to increase the reception performance under a multipath environment. Hereinafter, the guard interval is explained, referring to FIGS. 2A and 2B. In FIGS. 2A and 2B, it is assumed that under a multipath environment where a main wave (desired wave) and a delay wave (undesired wave) are present, FFT is performed for symbol n of a received OFDM signal.

The FFT calculation is performed by inputting, into the FFT unit 104, information within the FFT window that is set on the time axis. The width of the FFT window corresponds to one symbol time. At this time, without a guard interval inserted between symbols, when obtaining information in a symbol n of the main wave, not only information in the symbol n of the delay wave but also information in a symbol n−1 of the delay wave are obtained, as illustrated in FIG. 2A. In other words, the data of the symbol n are to be recovered on the basis of the information in the symbol n and the information in the symbol n−1. This causes inter-symbol interference, decreasing the reception quality.

Therefore, according to the OFDM system, a guard interval is interested between symbols, as illustrated in FIG. 2B. A guard interval i (i represents a number for identifying each symbol) is obtained by copying information at the end of a symbol i. In Mode 3 of ISDB-T, a guard interval corresponds to ⅛ symbol period.

When the FFT window is set at the symbol timing of the main wave as illustrated in FIG. 2B, information in the symbol n of the delay wave and information in guard interval n of the delay wave are obtained with the acquisition of information in the symbol n of the main wave. However, the information in the guard interval n has been obtained by copying a part of the information in the symbol n. Therefore, in this case, the FFT calculation is performed only for the information in the symbol n. As a result, inter-symbol interference does not occur, improving the reception quality.

However, depending on the configuration of the communication system, an OFDM receiver may receive a main wave and its preceding wave. For example, in an SFN (Signal Frequency Network), a plurality of transmitting stations (or relay stations) transmit the same signal simultaneously. Now, it is assumed that the transmission power of a first transmitting station located near the receiver is low, and the transmission power of a second transmitting station located far from the receiver is high. Then, the signal from the first transmitting station arrives at the receiver earlier than the signal from the second transmitting station, but the wave received from the first transmitting station may be weaker than the wave received from the second transmitting station. In this case, the wave received from the second transmitting station is the main wave and the wave received from the first transmitting station is the preceding wave. A preceding wave is sometimes called "preceding ghost".

In the case in which the interference wave is a preceding wave, the FFT window control at the symbol timing of the main wave as illustrated in FIG. 3A leads to the occurrence of inter-symbol interference. In other words, when obtaining information in the symbol n of the main wave, not only information in the symbol n of the preceding wave but also information in a symbol n+1 of the preceding wave are obtained. For this reason, when the interference wave is a preceding wave, the FFT window is controlled at the symbol timing of the preceding wave, as illustrated in FIG. 3B. Under this window control, demodulated data is obtained from information in the target symbol only.

A reception apparatus including a filter circuit, an equalization circuit, and a decision circuit described below has been known as an art related to OFDM. The filter circuit performs band restriction, using a plurality of filter coefficients having wider bandwidths than the guard interval contained in a transmission signal transmitted through the transmission path, to a transmission path estimation signal that is used for estimating characteristics of the transmission path. The equalization circuit equalizes the transmission signal using the transmission path estimation signal with the band restriction. The decision circuit detects the signal quality of the transmission signal after the equalization, and decides the optimal filter coefficient in accordance with the detection result.

A reception apparatus that calculates the delay time between the earliest-arrival signal and a delay wave (main wave) and decides the start timing of the FFT window on the basis of the delay time has been known as another art relates to OFDM.

A receiving method in which the FFT window position is corrected by calculating, using a delay profile, the delay time between the current FFT window position and the window position that should be applied to a preceding ghost, has been know as another art related to OFDM.

These arts are described in, for example, Japanese Patent Application Publications No. 2006-311385, No. 2001-292125, No. 2004-304618, and No. 2004-96187.

With OFDM, quality degradation due to inter-symbol interference can be suppressed by disposing a guard interval as described above. However, in a certain communication environment, a multipath delay larger than a guard interval may occurs. That is, the time difference between the main wave and an interference wave may become larger than the guard interval.

The occurrence of multipath delay that is larger than the guard interval inevitably results in the occurrence of inter-symbol interference, as illustrated in FIG. 4A and FIG. 4B. When the interference wave is a delay wave, the FFT window is set to extract the symbol of the main wave, as illustrated in FIG. 4A. In this case, not only the signal component in a symbol n but also the signal component in a symbol n−1 is extracted from the delay wave. Then, the signal component in the symbol n−1 of the delay wave interferes with the signal component in the symbol n of the main wave. However, the reception power of the delay wave is smaller than the reception power of the main wave. Therefore, the influence from the inter-symbol interference is, basically, not significant.

Meanwhile, when a preceding wave is present, the FFT window is set to extract the symbol of the preceding wave, as illustrated in FIG. 4B. In this case, the main wave acts as an interference component. Then, not only the signal component in the symbol n but also the signal component in the symbol n−1 are extracted from the main wave. Then, the signal component in the symbol n−1 of the main wave interferes with the signal component in the symbol n of the preceding wave. At this time, the reception power of the main wave is larger than the reception power of the preceding wave. Therefore, the influence from the inter-symbol interference is, basically, significant.

FIGS. 5A-5C are diagrams illustrating bathtub curves in the conventional arts. In FIGS. 5A-5C, the horizontal axis represents multipath delay. The positive value represents the time difference between the main wave and a delay wave, and the negative value represents the time difference between the main wave and a preceding wave. The vertical axis represents the D/U ratio to obtain a predetermined reception quality. The D/U ratio is the ratio of the powers of a desired wave (main wave) and an undesired wave (interference wave). For example, "D/U=3 dB" indicates that the predetermined reception quality can be obtained when the reception power of the undesired wave is 3 dB lower than that of the desired wave. FIGS. 5A-5C represents the simulation results in the case in which the modulation method is QPSK and only one undesired wave is present. In addition, FIGS. 5A, 5B, 5C represent the characteristics with the guard interval being 252μ seconds, 126μ seconds, 63μ seconds, respectively.

The reception quality is dependent on the size of the guard interval. Specifically, a smaller guard interval results in a narrower acceptable range for multipath delay.

In addition, the reception quality deteriorates more easily when the interference wave is a preceding wave, compared to the case where the interference wave is a delay wave. For example, it is assumed that the guard interval is 126μ seconds. In this case, as illustrated in FIG. 5B, when the interference wave is a delay wave, the reception quality remains good as long as the time difference between the main wave and the delay wave is no more than 260μ seconds. However, when the interference wave is a preceding wave, the reception quality deteriorates as the time difference between the main wave and the delay wave exceeds 250μ seconds.

Then, it is assumed that the guard interval is 63μ seconds. In this case, as illustrated in FIG. 5C, when the interference wave is a delay wave, the reception quality remains generally good as long as the time difference between the main wave and the delay wave is no more than 250μ seconds. However, when the interference wave is a preceding wave, the reception quality start deteriorating when the time difference between the main wave and the preceding wave exceeds 100μ seconds, and the reception quality significantly deteriorates when the time difference exceeds 200μ seconds.

Thus, in the conventional arts, the reception quality deteriorates easily, when a preceding wave is present in a communication system that uses OFDM, with a large time difference between the main wave and the preceding wave. For this reason, there has been a need for improving the reception quality in the presence of a preceding wave in a communication system that uses OFDM.

SUMMARY

According to one aspect of the embodiment, an OFDM receiver comprising: an FFT unit generating a frequency domain signal from an OFDM signal by Fourier transform; and a delay profile generation unit generating a delay profile of the OFDM signal using the frequency domain signal, wherein when a time difference between a main wave and a preceding wave detected using the delay profile is larger than a guard interval of the OFDM signal, the FFT unit sets a start position of a calculation range of the Fourier transform at a position shifted forward from a symbol start position of the main wave by an amount corresponding to the guard interval.

According to another aspect of the embodiment, an OFDM receiver that receives an OFDM signal carrying a data signal and a pilot signal, comprising: an FFT unit generating a frequency domain signal from the OFDM signal by Fourier transform; a delay profile generation unit generating a delay profile of the OFDM signal using the frequency domain signal; a filter unit performing a filtering operation for interpolation in a frequency axis direction for the pilot signal extracted from the frequency domain signal; and an equalization unit equalizing the data signal extracted from the frequency domain signal using the pilot signal filtered by the filter unit, wherein when a time difference between a main wave and a preceding wave detected using the delay profile is larger than a guard interval of the OFDM signal, the FFT unit sets a start position of a calculation range of the Fourier transform at a position shifted forward from a symbol start position of the main wave by an amount corresponding to the guard interval, and the filter unit performs a band filtering operation to pass the main wave and the preceding wave.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

BRIEF DESCRIPTION OF DRAWINGS

FIGS. 3A and 3B are diagrams illustrating the control of the FFT window in the presence of a preceding wave.

FIG. 6 is a diagram illustrating the configuration of an OFDM receiver according to an embodiment.

FIG. 7 is a diagram illustrating the arrangement and interpolation of an SP signal.

FIGS. 9A and 9B are diagrams illustrating a delay profile.

FIG. 12 is a table summarizing the control of the FFT window and the filter band.

FIG. 13 is an example of a coefficient table.

DESCRIPTION OF EMBODIMENTS

Figure 1:
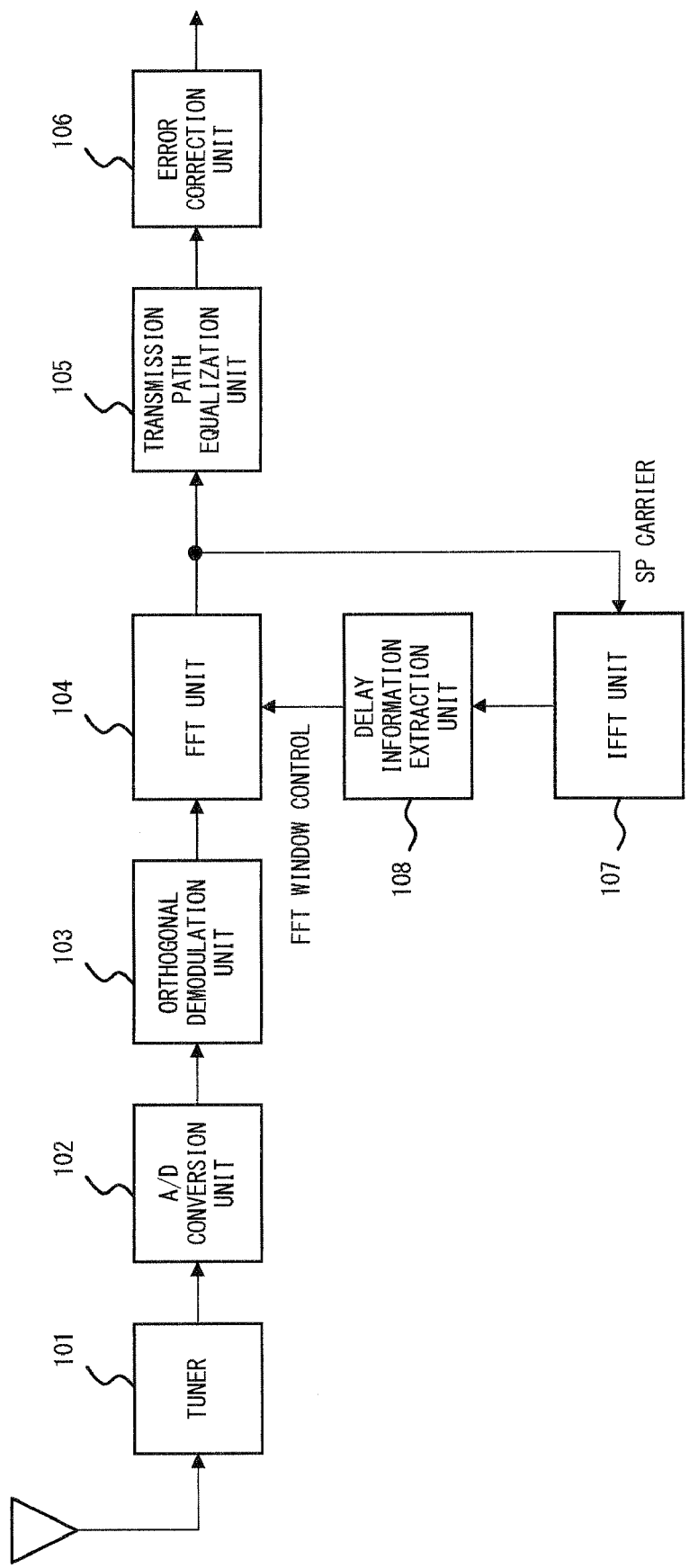
FIG. 1 is a diagram illustrating the configuration of an example of an OFDM receiver.

FIG. 6 is a diagram illustrating the configuration of an OFDM receiver according to an embodiment. An OFDM receiver 1 according to the embodiment includes a tuner 101, an A/D conversion unit 102, an orthogonal demodulation unit 103, an FFT unit 104, a transmission path equalization unit 105, an error correction unit 106, an SP interpolation unit 10, an IFFT unit 21, an FFT window control unit 22, a delay amount calculation unit 23, a control determination unit 24, and a filter band calculation unit 25. Although it is not a particular limitation, the tuner 101, A/D conversion unit 102, orthogonal demodulation unit 103, FFT unit 104, transmission path equalization unit 105, and error correction unit 106 may be realized by a known art, and their operations are, for example, as described above, referring to FIG. 1.

The OFDM receiver 1 demodulates a received OFDM signal and recovers transmitted data. In this example, although it is not a particular limitation, the OFDM receiver 1 is supposed to receive and demodulate an OFDM signal transmitted through ISDB-T that is one of digital terrestrial broadcast standards.

In ISDB-T, a data signal, a scattered pilot (SP) signal, auxiliary channel (AC) signal, transmission and multiplexing configuration control (TMCC) signal, etc, are transmitted using an OFDM signal. The data signal, SP signal, AC signal, and TMCC signal can be extracted respectively, by converting the received OFDM signal in the FFT unit 104 into a frequency domain signal. The data signal is directed to the transmission path equalization unit 105, and the SP signal is directed to the SP interpolation unit 10. While the AC signal and TMCC signal are demodulated by a demodulation circuit (not illustrated in the drawing), explanation about them are omitted as they are not directly relevant to the present embodiment.

FIG. 7 is a diagram illustrating the arrangement and interpolation of the SP signal. The SP signal is a known signal for which the transmission phase and the transmission power have been determined in advance, and is used for estimating a transmission path. The SP signal is inserted for every 12 carriers in the frequency-axis direction. Each carrier is provided, for example, in Mode 3 of ISDB-T, at a 1 kHz interval. In addition, the SP signal is inserted for every 4 symbols in the time-axis direction. One symbol time is, for example, 1.008 milliseconds. In the example in FIG. 7, in the time slot for transmitting an Nth symbol, the SP signal is transmitted using carriers C1, C13 . . . . In the time slot for transmitting an N+1th symbol, the SP signal is transmitted using carriers C4, C16 . . . .

The SP interpolation unit 10 includes a symbol interpolation unit 11 and a carrier interpolation unit 12 to interpolate the SP signals. The symbol interpolation unit 11 performs an interpolation process in the time direction for each carrier transmitting the SP signal. In the example in FIG. 7, for carrier C1, the signals in time slots N+1, N+2, N3 are estimated on the basis of the signal in a time slot N and the signal in a time slot N+4. The similar interpolation process is performed for other carriers (C4, C7, C10 . . . ) in which the SP signal is located. As a result, in each carrier C1, C4, C7, C10 . . . to which the SP signal is inserted, the transmission path information is obtained for all symbols. Meanwhile, the symbol interpolation unit 11 may be configured to perform, for example, linear interpolation, although it is not a particular limitation.

The carrier interpolation unit 12 is a digital filter such as an FIR filter or an IIR filter, and performs an interpolation process in the frequency-axis direction using the result of the interpolation performed by the symbol interpolation unit 11. In other words, in the example in FIG. 7, the carrier interpolation unit 12 estimates, in each time slot, the signals in carriers C2, C3, C5, C6, C8, C9 . . . using the signals in carriers C1, C4, C7 . . . . As a result, the reception information for the SP signal is obtained in all carriers. Since the transmission phase and the transmission power of the SP signal have been determined in advance, the transmission path characteristics information (such as the phase information) of the SP signal can be obtained on the basis of the reception information of the SP signal. Thus, the SP interpolation unit 10 generates the transmission path characteristics information for each carrier.

The IFFT unit 21 converts an SP signal contained in a frequency domain signal output from the FFT unit 104 into a time domain signal. At this time, the IFFT unit 21 may use the SP signal for which interpolation has been performed by the symbol interpolation unit 11.

Figure 8:
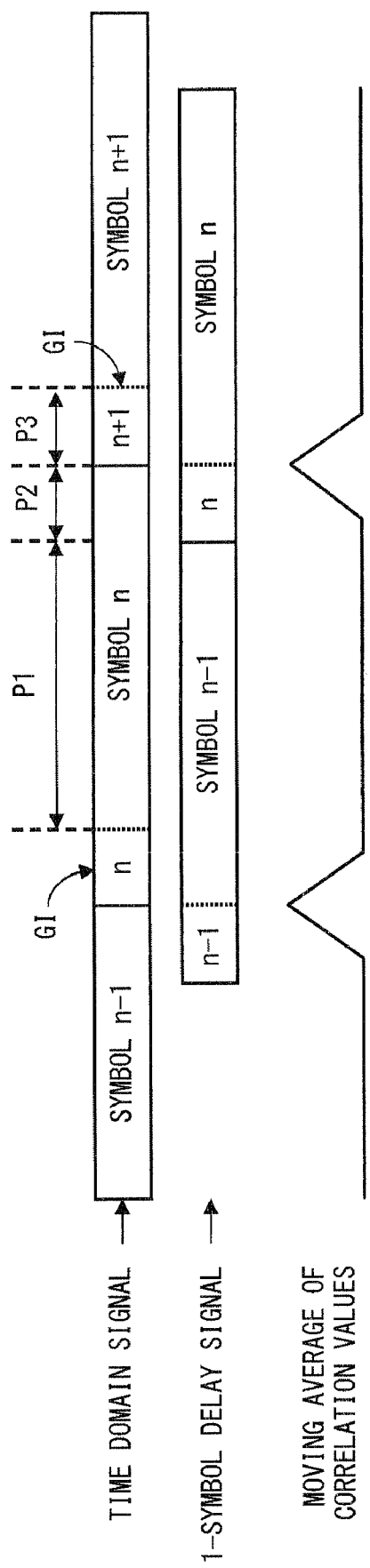
FIG. 8 is a diagram illustrating a method for detecting the symbol timing.

The FFT window control unit 22 controls the position of the FFT window that represents the calculation range for the FFT unit 104. In order to control the position of the FFT window, the FFT window control unit 22 detects the head position (or starting point) of each symbol. The head position of each symbol is detected, for example, using a guard interval inserted between symbols. Specifically, as illustrated in FIG. 8, the correlation between the time domain signal obtained by the IFFT unit 21 and its delay signal is calculated. Alternatively, an input signal to the FFT unit 104 and its delay signal may be obtained. The delay time is one symbol period. The head position of each symbol is obtained by calculating the moving average of the correlation values between these signals. The moving range for the moving average calculation is, for example, the guard interval.

In FIG. 8, the correlation between a symbol n and a symbol n−1 is calculated in period P1. In this case, the correlation is small. In period P2, the correlation between the symbol n and a guard interval n is calculated. At this time, the signal in the guard interval n is the one obtained by copying the signal of the symbol n. In other words, the correlation between the symbol n and the symbol n is calculated in the period P2. Therefore, the correlation is large in the period P2. Accordingly, the moving average of the correlation values increases in the period P2. In period P3, the correlation between a guard interval n+1 and the symbol n is calculated. In this case, the correlation is small. Therefore, the moving average of the correlation values decrease in the period P3. As a result, the moving average of the correlation values has a peak at the timing of the shift from the period P2 to period P3. Accordingly, the symbol timing can be detected by monitoring the moving average of the correlation values.

The delay amount calculation unit 23 generates a delay profile of an OFDM signal using the time domain signal obtained by the IFFT unit 21. The delay profile represents the variation of the reception power on the time axis. The received wave with the largest reception power is detected as the main wave (desired wave). Another received wave having the reception power above a predetermined level is detected as an interference wave (undesired wave). A delay wave illustrated in FIG. 9A, and/or a preceding wave illustrated in FIG. 9B are expected to be detected as the interference wave. Then, the delay amount calculation unit 23 calculates the time difference (that is, the delay amount) between the main wave and the interference wave, on the basis of the delay profile. Meanwhile, the time difference between the main wave and a delay wave may be represented by a "positive value," and the time difference between the main wave and a preceding wave may be represented by a "negative value."

The control determination unit 24 determines the state of multipath on the basis of the delay amount calculated by the delay calculation unit 23. The following three states are expected as the state of multipath.

1) No preceding wave is present (in this example, it is assumed that there is a delay wave).
2) A preceding wave is present, and the time difference between the main wave and the preceding wave is smaller than the guard interval of the OFDM signal.
3) A preceding wave is present, and the time difference between the main wave and the preceding wave is larger than the guard interval of the OFDM signal.

The control determination unit 24 informs the determination result (including information representing the delay amount) to the FFT window control unit 22. The FFT window control unit 22 then determines the position of the FFT window (that is, information indicating the timing to extract the signal for which the FFT unit 104 is to perform the FFT), in accordance with the informed determination result. Accordingly, the FFT unit 104 performs FFT with the FFT window determined in accordance with the state of multipath. The control determination unit 24 also informs the determination result to the filter band calculation unit 25.

The filter band calculation unit 25 controls the passband of the digital filter provided in the carrier interpolation unit 12. Then, the carrier interpolation 12 interpolates the SP signals (or the transmission path characteristics information obtained from the SP signals) in the frequency direction with the passband controlled by the filter band calculation unit 25.

The transmission path equalization unit 105 is provided with the data signal and the transmission path characteristics information for each carrier obtained by the SP interpolation unit 10. The transmission path equalization unit 105 corrects the data signal by performing complex division using the transmission path characteristics information. As a result, the effect due to the transmission path is removed. That is, the data signal is equalized. In this regard, "equalization" includes the process to correct a phase rotation occurring in the transmission path. The demodulated data obtained by the transmission path equalization unit 105 is converted into binary data having one bit or a plurality of bits by the demapping process. After a correction process is performed by the error correction circuit 106, recovered data is output in the transform stream (TS) format.

The operations of the OFDM signal receiver 1 is explained next.

<Multipath State 1>

Figure 2A:
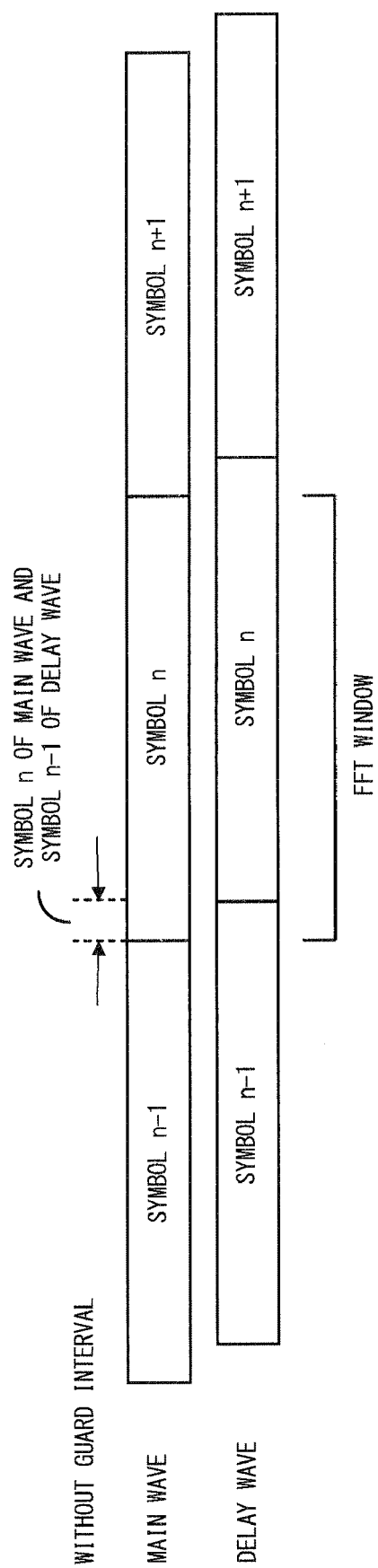
FIGS. 2A and 2B are the diagrams illustrating the guard interval.
Figure 2B:
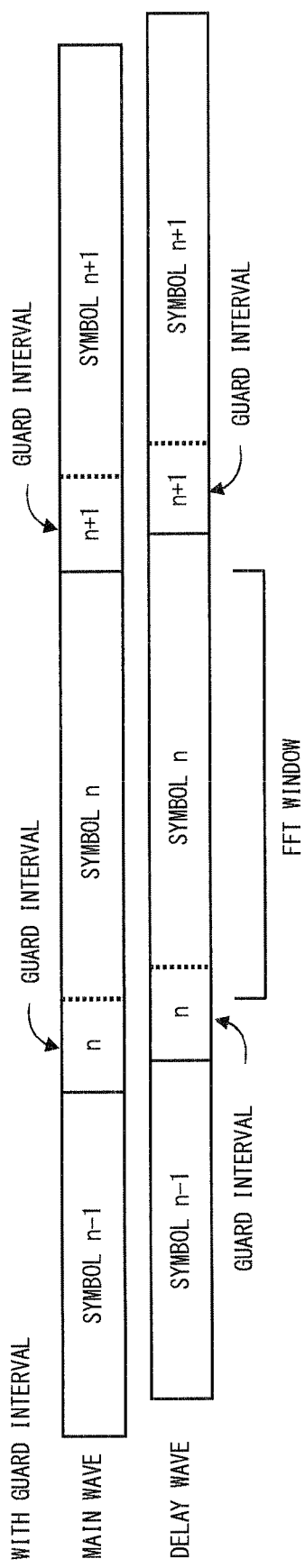

When no preceding wave is present, the FFT window control unit 22 sets the start position of the FFT window at the symbol start position of the main wave, as illustrated in FIG. 2B. In other words, the FFT window control unit 22 controls the position of the FFT window so that the signals in the period corresponding to the symbol area of the main wave are extracted. Accordingly, the FFT unit 104 performs the FFT for the signals in the period corresponding to the symbol area of the main wave.

Figure 10A:
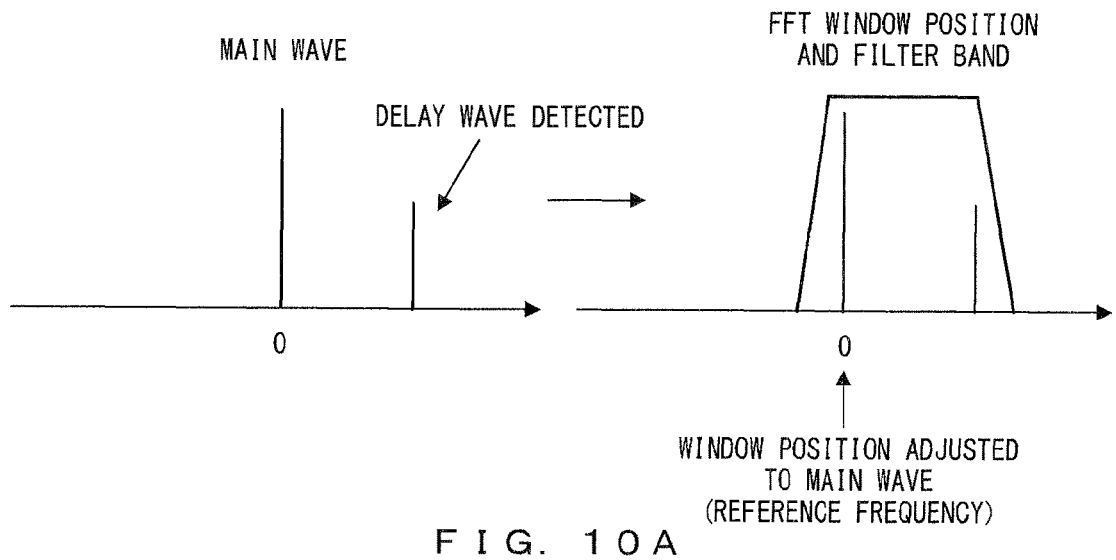
FIGS. 10A-10C are diagrams illustrating the band of a filter.

The filer band calculation unit 25 controls the band of the digital filter provided in the carrier interpolation unit 12 so that the filter passes the main wave and the delay wave, as illustrated in FIG. 10A. In this regard, the reference frequency of the band of the digital filter corresponds to the position of the FFT window. The positive side of the reference frequency (for example, the higher side of the reference frequency) is provided with a bassband having a width corresponding to the time difference between the main wave and the delay wave. The negative side of the reference frequency (for example the lower side of the reference frequency) is provided with no bassband. By setting the passband as described above, noise components can be removed as much as possible, while obtaining information of the main wave and the delay wave.

Meanwhile, when there is no preceding wave, even when the time difference between the main wave and the delay wave is larger than the guard interval, the FFT window is set so that the signals in the period corresponding to the symbol area of the main wave is extracted. In addition, the passband of the digital filter is narrowed as much as possible within the range that passes the main wave and the delay wave. Although inter-symbol interference occurs in this case, since the interference component is the delay wave having smaller power than the main wave, the reception quality does not deteriorate significantly.

<Multipath State 2>

Figure 3A:
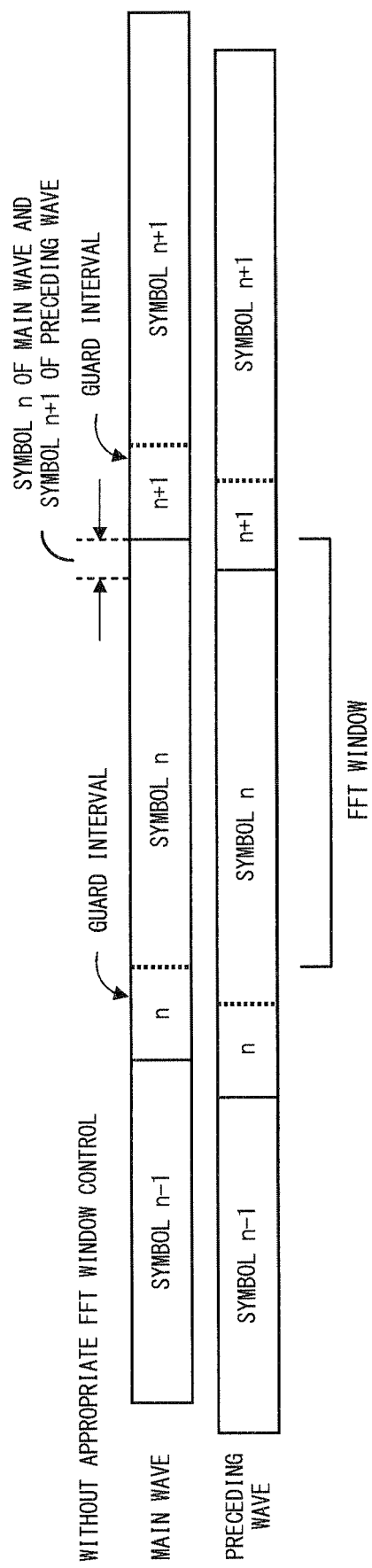
Figure 4A:
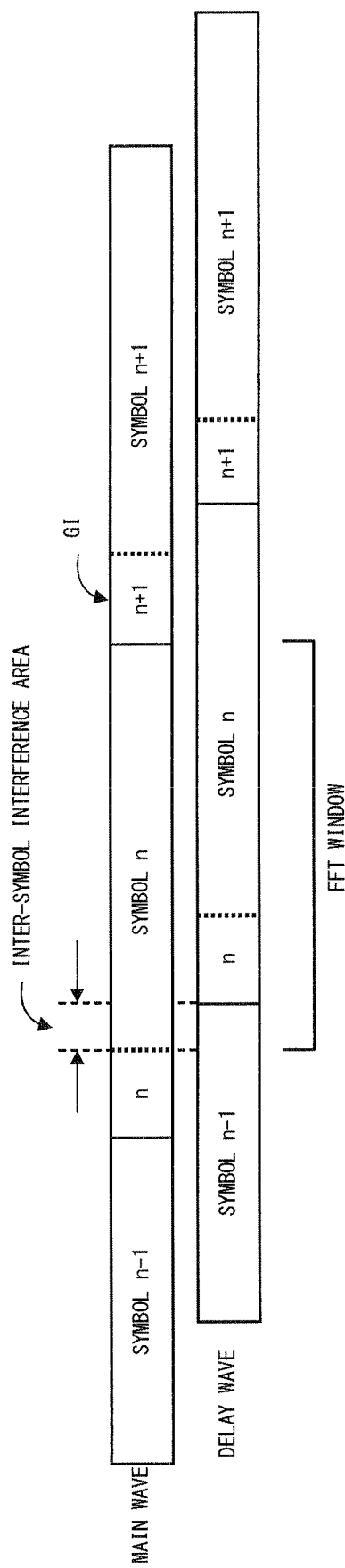
FIGS. 4A and 4B are diagrams illustrating the control of the FFT window in the presence of a large multipath delay.
Figure 4B:
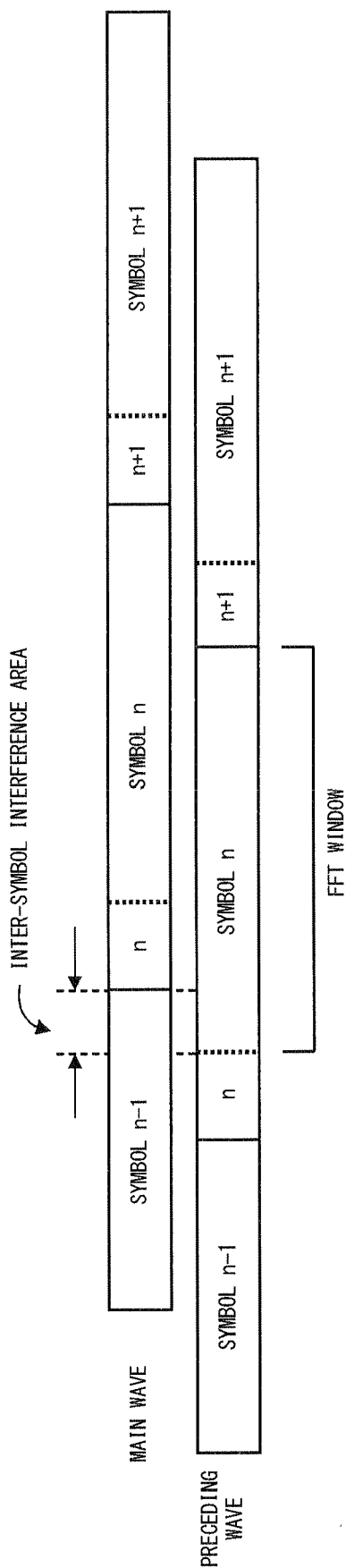

When a preceding wave is present and the time difference between the main wave and the preceding wave is smaller than the guard interval of the OFDM signal, the FFT window control unit 22 sets the start position of the FFT window at the symbol start position of the preceding wave, as illustrated in FIG. 3B. In other words, the FFT window control unit 22 controls the position of the FFT window so that the signals in the period corresponding to the symbol area of the preceding wave are extracted. Accordingly, the FFT unit 104 performs the FFT for the signal in the period corresponding to the symbol area of the preceding wave. When the time difference between the main wave and the preceding wave is smaller than the guard interval of the OFDM signal and the position of the FFT window is controlled as described above, inter-symbol interference does not occur. Therefore, in this case, the reception quality is good.

Figure 10B:
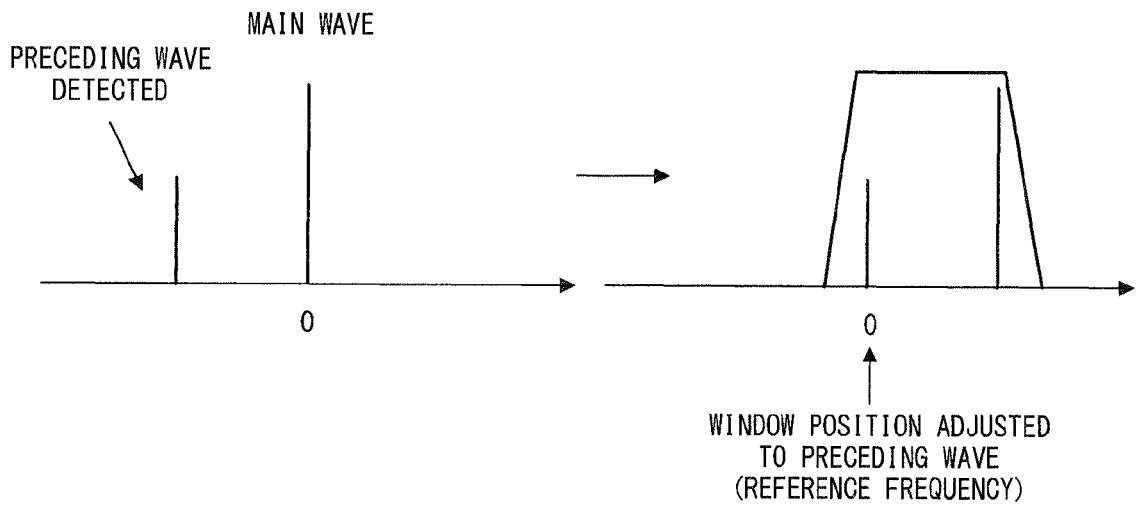

The filer band calculation unit 25 controls the band of the digital filter provided in the carrier interpolation unit 12 so that the filter passes the main wave and the preceding wave, as illustrated in FIG. 10B. In this regard, the reference frequency of the band of the digital filter corresponds to the position of the FFT window. The positive side of the reference frequency is provided with a bassband having a width corresponding to the time difference between the main wave and the preceding wave. The negative side of the reference frequency is provided with no bassband. By setting the passband as described above, noise components can be removed as much as possible, while obtaining information of the main wave and the preceding wave.

<Multipath State 3>

Figure 11:
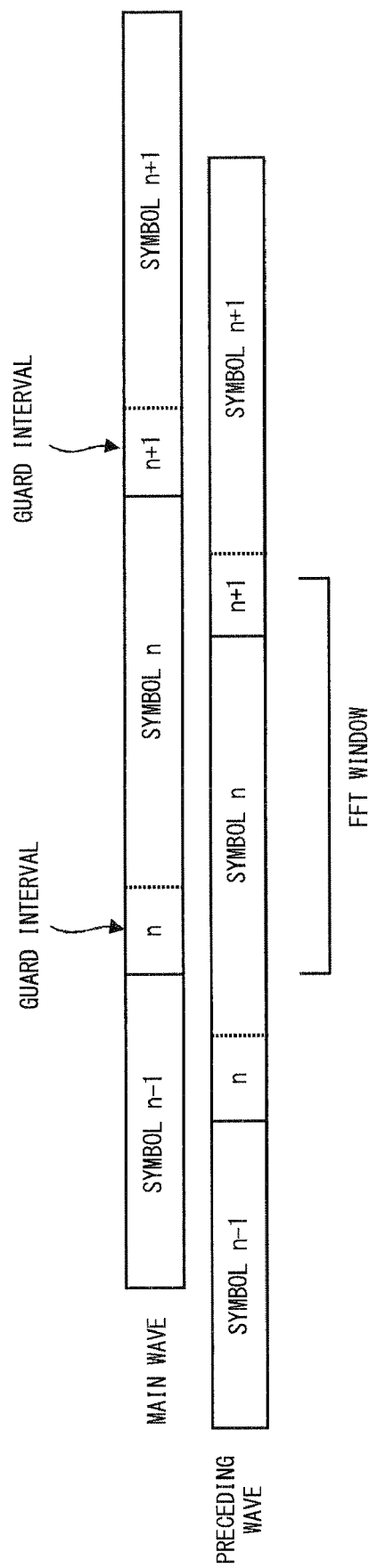
FIG. 11 is a diagram illustrating the control of the FFT window in an embodiment.

When a preceding wave is present and the time difference between the main wave and the preceding wave is larger than the guard interval of the OFDM signal, the FFT window control unit 22 sets the start position of the FFT window at the position shifted forward from the symbol start position of the main wave by an amount corresponding to the guard interval, as illustrated in FIG. 11. In other words, when the FFT is to be performed for a symbol n, the FFT window control unit 22 controls the position of the FFT window so that the signals in the period starting from the head position of a guard interval n of the main wave, the length of the period corresponding to the symbol period, are extracted. Accordingly, the FFT unit 104 performs the FFT for the signals in the period starting from the head position of the guard interval n of the main wave, the length of the period corresponding to the symbol period.

With the FFT window being set as described above, when the FFT is performed for the symbol n, only the signals of the symbol n (including the guard interval n) are extracted from the main wave having the larger reception power. Meanwhile, not only the signals of the symbol n but also the signals of a symbol n+1 (including a guard interval n+1) are extracted from the preceding wave. Here, the extracted signals of the symbol n+1 interfere with the signals of the symbol n. However, the extracted signal component in the symbol n+1 has been minimized under the condition "only the signals of the symbol n are extracted from the main wave." In addition, the reception power of the preceding wave is smaller compared to that of the main wave. Therefore, the influence of the inter-symbol interference by the symbol n+1 is suppressed.

Meanwhile, if the FFT window is shifted in the positive direction on the time axis relative to the position illustrated in FIG. 11, the signal component of the symbol n+1 extracted from the preceding wave becomes larger. If the FFT window is shifted in the negative direction on the time axis relative to the position illustrated in FIG. 11, the signal component of the symbol n−1 is extracted from the main wave. Therefore, in order to suppress the inter-symbol interference, it is preferable to control the FFT window to the position illustrated in FIG. 11. However, in the multipath state 3, the start position of the FFT window does not need be set at the position shifted forward from the symbol start position of the main wave by the amount exactly corresponding to the guard interval. The effect of suppressing the inter-symbol interference can be obtained as long as the start position of the FFT window is set at a position shifted forward from the symbol start position of the main wave by the amount approximately corresponding to the guard interval.

Figure 10C:
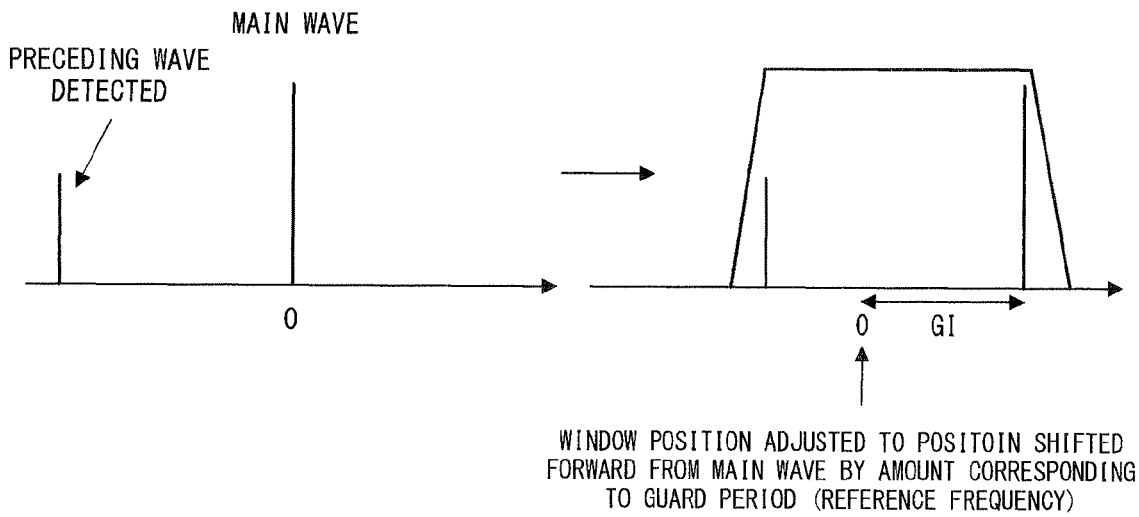

The filer band calculation unit 25 controls the band of the digital filter provided in the carrier interpolation unit 12 so that the filter passes the main wave and a preceding wave, as illustrated in FIG. 10C. In this regard, the reference frequency of the band of the digital filter corresponds to the position of the FFT window. In other words, the reference frequency corresponds to the position shifted forward from the symbol start position of the main wave by the amount corresponding to the guard interval. The positive side of the reference frequency is provided with a bassband having a width corresponding to the guard interval, in order to pass the main wave. The negative side of the reference frequency is provided with a pass band with a width corresponding to "the time obtained by subtracting the guard interval from the time difference between the main wave and the preceding wave", in order to pass the preceding wave. By setting the passband as described above, noise components can be removed as much as possible, while obtaining information of the main wave and the preceding wave.

A table summarizing the control of the FFT window and the control of the filter band in the OFDM receiver 1 according to the embodiment is illustrated in FIG. 12. As illustrated in FIG. 12, when no preceding wave is present, the control of the FFT window and the control of the filter band do not depend on the amount of multipath delay. By contrast, when a preceding wave is present, the control of the FFT window and the control of the filter band differ depending on whether the time difference between the main wave and its preceding wave is larger or smaller than the guard interval.

Next, the band of the digital filter provided in the carrier interpolation unit 12 is explained. The digital filter is realized by, for example, an FIR filter or an IIR filter. In the following descriptions, the digital filter is supposed to be an FIR filter, although it is not a particular limitation.

An FIR filter generally comprises serially-connected delay elements (the number of the delay elements being k−1), multipliers (the number of the multipliers being k), and an adder. An input signal is provided to the first delay element. Then, the k−1 delay elements generate k−1 delay signals respectively having different delay times. The first multiplier multiplies the input signal by a filter coefficient C1. In the same manner, the second through n-th multipliers respectively multiply corresponding delay signals by filter coefficients C2 through Cn. The adder then adds the results of the multiplication obtained by the respective multipliers.

In the configuration described above, the FIR filter operates as an interpolation circuit, when the filter coefficients C1 through Cn are set appropriately. At this time, the passband of the FIR filter can be adjusted arbitrarily by changing the combination of the filter coefficients C1 through Cn. The number of taps and the delay times for the respective delay elements in FIR filter are supposed to be designed as needed, in accordance with the symbol cycle, guard interval length and so on.

FIG. 13 is an example of a coefficient table that stores filter coefficients. Filter coefficients C1 through Cn are registered in the coefficient table in relation to the time difference between the main wave and an interference wave. In this example, the time difference between the main wave and a delay wave is indicated by a positive value, and the time difference between the main wave and a preceding wave is indicated by a negative value. The coefficient table is held by, for example, the filter band calculation unit 25.

In the coefficient table, for example, C1(20) through Cn(20) are the filter coefficients to be used when an interference wave (delay wave) that arrives 20μ seconds later than the main wave is detected. When the filter coefficients are selected, the FIR filter operates so as to form a passband corresponding to 20μ seconds on the higher side of the reference frequency. Meanwhile, C1(−20) through Cn(−20) are the filter coefficients to be used when an interference wave (preceding wave) that arrives 20μ seconds earlier than the main wave is detected. When the filter coefficients are selected, the FIR filter operates so as to form a passband corresponding to 20μ seconds on the lower side of the reference frequency.

Similarly, C1(−200) through Cn(−200) are the filter coefficients to be used when an interference wave (preceding wave) that arrives 200μ seconds earlier than the main wave is detected. At this time, assuming the guard interval of the OFDM signal as 126μ seconds, the time difference between the main wave and the preceding wave is larger than the guard interval. In this case, when the filter coefficients are set, the FIR filter forms a 126μ-second passband on the higher side of the reference frequency, and forms a 74 (=200−126) μ-second passband on the lower side of the reference frequency.

The filter coefficients stored in the coefficient table are supposed to have been obtained in advance by an experiment or simulation. The filter band calculation unit 25 selects corresponding coefficients from the coefficient table in accordance with the time difference between the main wave and the interference wave, and provides them to the carrier interpolation unit 12.

Figure 5A:
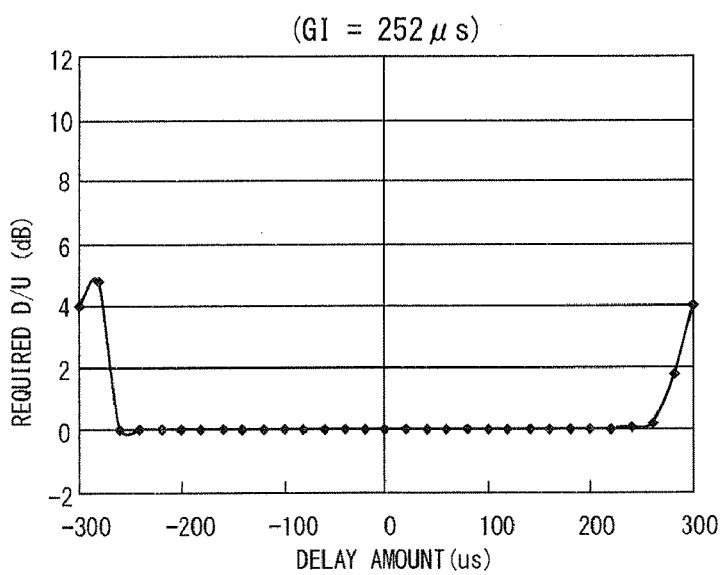
FIGS. 5A-5C are diagrams illustrating bathtub curves in the conventional arts.
Figure 5B:
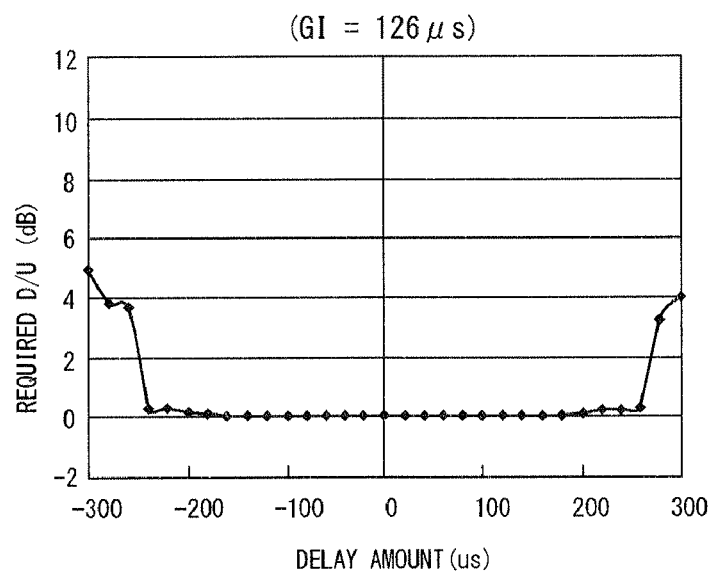
Figure 5C:
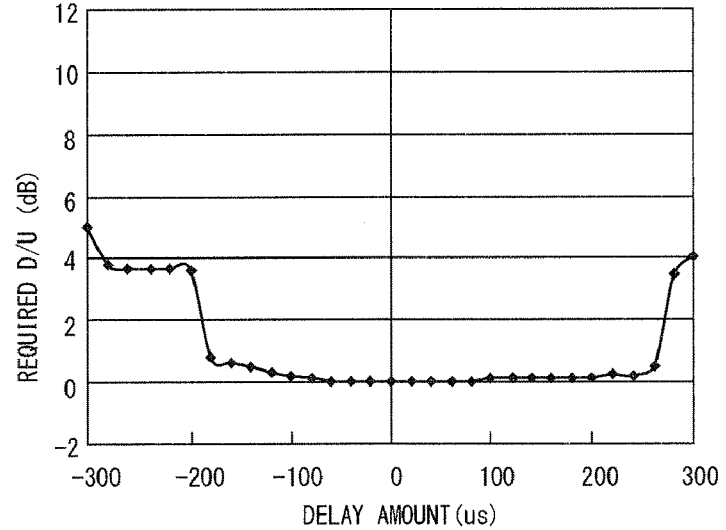
Figure 14A:
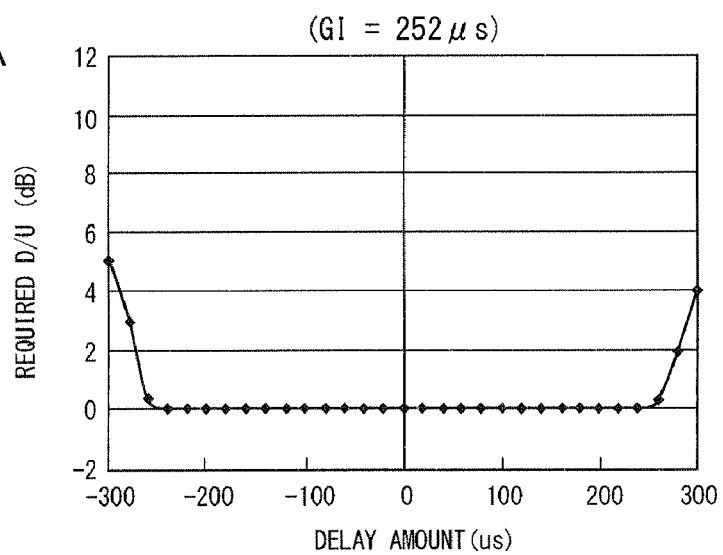
FIGS. 14A-14B are diagrams illustrating bathtub curves with the OFDM receiver according to an embodiment.
Figure 14B:
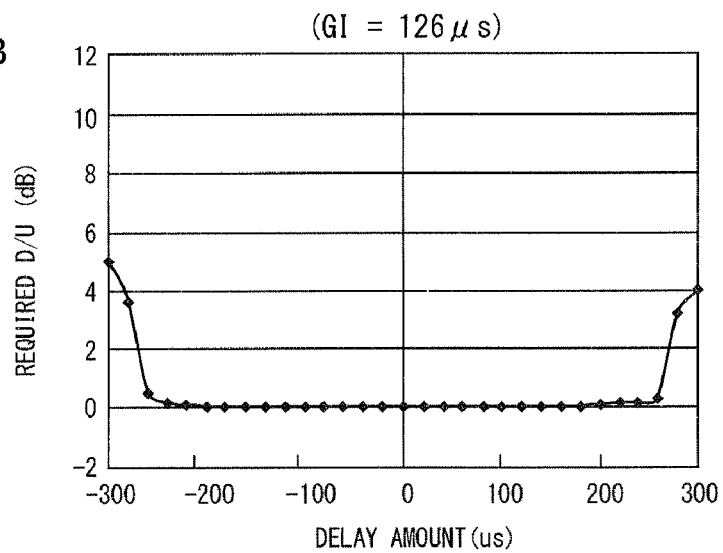
Figure 14C:
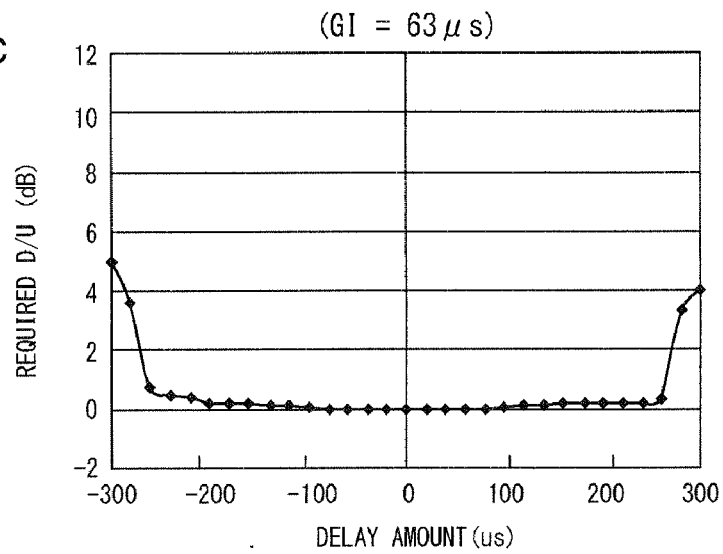

FIGS. 14A through 14C are diagrams illustrating bathtub curves with the OFDM receiver 1 according to the embodiment. In the same manner as in FIGS. 5A through 5C, the characteristics illustrated in FIGS. 14A through 14C represent the results of simulation where the modulation method is QPSK and only one undesired wave is present. In addition, FIGS. 14A, 14B, and 14C represent the characteristics with the guard interval being 252 μseconds, 126μ seconds, and 63μ seconds, respectively.

With the OFDM receiver 1 according to the embodiment, there is little difference in characteristics between the case in which the interference wave is a delay wave, and the case in which the interference wave is a preceding wave. Particularly, as illustrated in FIG. 14C, even when the interference wave is a preceding wave and the time difference between the main wave and the preceding wave is larger than the guard interval, the deterioration of the characteristics is very small. In the example in FIG. 14C, the reception quality remains good until the time difference between the main wave and the interference wave exceeds about 260μ seconds in both cases where the interference wave is a delay wave and a preceding wave.

Meanwhile, in the OFDM receiver having the configuration described above, the function to control the FFT window and the passband by generating a delay profile may be realized by a hardware circuit or by using software.

In addition, the OFDM receiver and receiving method according to the present invention are not limited for use with the digital TV broadcast, and are capable of receiving other OFDM signals.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An OFDM (Orthogonal Frequency Division Multiplexing) receiver comprising:
   an FFT (Fast Fourier Transform) unit that generates a frequency domain signal from an OFDM signal by Fourier transform; and
   a delay profile generation unit that generates a delay profile of the OFDM signal using the frequency domain signal, wherein
   when a time difference between a main wave and a preceding wave detected using the delay profile is larger than a guard interval of the OFDM signal, the FFT unit sets a start position of a calculation range of the Fourier transform at a position shifted forward from a symbol start position of the main wave by an amount corresponding to the guard interval.

2. The OFDM receiver according to claim 1, wherein
   when a time difference between a main wave and a preceding wave is smaller than the guard interval of the OFDM signal, the FFT unit sets the start position of the calculation range at a symbol start position of the preceding wave.

3. The OFDM receiver according to claim 1, wherein
   when no preceding wave is present, the FFT unit sets the start position of the calculation range at the symbol start position of the main wave.

4. An OFDM (Orthogonal Frequency Division Multiplexing) receiver that demodulates an OFDM signal to which a pilot signal is inserted in a frequency domain, comprising:
   a Fourier transform circuit that performs Fourier transform on an OFDM signal;
   a symbol interpolation unit that performs an interpolation process on a time axis for the pilot signal extracted from an output signal from the Fourier transform circuit;
   a carrier interpolation circuit that performs an interpolation process on a frequency axis for the pilot signal extracted from an output signal from the Fourier transform circuit;
   a filter control unit that controls a passband of a filter included in the carrier interpolation unit;
   an inverse Fourier transform circuit that converts a frequency domain signal output from the symbol interpolation unit into a time domain signal using inverse Fourier transform;

an FFT (Fast Fourier Transform) window control unit that generates, from the time domain signal, a delay profile representing a reception power on a time axis and setting a Fourier transform window position of the Fourier transform circuit at a range including a main wave and an interference wave based on the delay profile;

a delay amount detection unit that calculates, from the delay profile, a delay time between a main wave and an interference wave; and a control determination unit that compares the delay time and a guard interval time inserted between symbols of the OFDM signal, and controlling the FFT window control unit or the filter control unit, wherein when the delay time exceeds the guard interval, the control determination unit controls the FFT window control unit so that the position of the time window, within the OFDM signal, indicating a range in which Fourier transform is to be performed by the Fourier transform circuit corresponds to positions of the main wave and preceding wave, and controls the filter control unit so that filter characteristics correspond to a band that passes the main wave and the preceding wave.

5. The OFDM receiver according to claim 4, wherein the carrier interpolation unit is an FIR filter, and the filter control unit controls a passband by adjusting a tap coefficient of the FIR filter.

6. The OFDM receiver according to claim 4, wherein the pilot signal is a scattered pilot signal in a digital terrestrial broadcast.

7. An OFDM (Orthogonal Frequency Division Multiplexing) receiver that receives an OFDM signal carrying a data signal and a pilot signal, comprising:

an FFT (Fast Fourier Transform) unit that generates a frequency domain signal from the OFDM signal by Fourier transform;

a delay profile generation unit that generates a delay profile of the OFDM signal using the frequency domain signal;

a filter unit that performs a filtering operation for interpolation in a frequency axis direction for the pilot signal extracted from the frequency domain signal; and an equalization unit that equalizes the data signal extracted from the frequency domain signal using the pilot signal filtered by the filter unit, wherein when a time difference between a main wave and a preceding wave detected using the delay profile is larger than a guard interval of the OFDM signal, the FFT unit sets a start position of a calculation range of the Fourier transform at a position shifted forward from a symbol start position of the main wave by an amount corresponding to the guard interval, and the filter unit performs a band filtering operation to pass the main wave and the preceding wave.

8. The OFDM receiver according to claim 7, wherein when a time difference between the main wave and a preceding wave is larger than the guard interval of the OFDM signal, the filter unit provides, with a calculation range of the FFT unit being a reference frequency, a positive-side passband for passing the main wave and a negative-side passband for passing the preceding wave.

9. The OFDM receiver according to claim 8, wherein a width of the positive-side passband corresponds to the guard interval, and a width of the negative-side passband corresponds to a time obtained by subtracting the guard interval from a time difference between the main wave and the preceding wave.

10. The OFDM receiver according to claim 7, wherein the filter unit comprises a digital filter and a coefficient control unit controlling a filter coefficient of the digital filter, and the coefficient control unit controls a passband of the digital filter by controlling the filter coefficient based on the delay profile.

11. The OFDM receiver according to claim 10, wherein the digital filter is a FIR filter.

12. An OFDM (Orthogonal Frequency Division Multiplexing) receiving method comprising:

generating a frequency domain signal from an OFDM signal by Fourier transform using an FFT (Fast Fourier Transform) circuit;

generating a delay profile of the OFDM signal using the frequency domain signal; and when a time difference between a main wave and a preceding wave detected using the delay profile is larger than a guard interval of the OFDM signal, setting, in the FFT circuit, a start position of a calculation range of the Fourier transform at a position shifted forward from a symbol start position of the main wave by an amount corresponding to the guard interval.

13. The OFDM receiver according to claim 1, further comprising:

a filter unit that performs a filtering operation for interpolation in a frequency axis direction for a pilot signal extracted from the frequency domain signal, and performing, when a time difference between a main wave and a preceding wave detected using the delay profile is larger than a guard interval of the OFDM signal, the filter unit performs a band filtering operation to pass the main wave and the preceding wave.

14. The OFDM receiver according to claim 13, wherein when a time difference between the main wave and a preceding wave is larger than the guard interval of the OFDM signal, the filter unit provides, with a calculation range of the FFT unit being a reference frequency, a positive-side passband for passing the main wave and a negative-side passband for passing the preceding wave.

15. The OFDM receiver according to claim 14, wherein a width of the positive-side passband corresponds to the guard interval, and a width of the negative-side passband corresponds to a time obtained by subtracting the guard interval from a time difference between the main wave and the preceding wave.

16. The OFDM receiver according to claim 13, wherein the filter unit comprises a digital filter and a coefficient control unit controlling a filter coefficient of the digital filter, and the coefficient control unit controls a passband of the digital filter by controlling the filter coefficient based on the delay profile.

17. An OFDM (Orthogonal Frequency Division Multiplexing) receiving method comprising:

controlling a passband of a filter being used for a carrier interpolation process on a frequency axis for a pilot signal extracted from an OFDM signal by Fourier transform using a Fourier transform circuit in an OFDM receiver;

setting a Fourier transform window position of the Fourier transform circuit at a range including a main wave and an interference wave based on a delay profile generated from a signal output from a symbol interpolation process on a time axis for the pilot signal, wherein when a delay time between the main wave and the interference wave exceeds a guard interval time inserted between symbols of the OFDM signal, the setting sets the Fourier transform window position so that a position of a time window, within the OFDM signal, indicating a range in which Fourier transform is to be performed by the Fourier transform circuit corresponds to positions of the main wave and a preceding wave of the interference wave, the preceding wave being an interference wave weaker than the main wave and arriving at the OFDM receiver earlier than the main wave, and the controlling controls the passband of the filter so that filter characteristics correspond to a band that passes the main wave and the preceding wave.

18. The OFDM receiver according to claim 4, wherein the FFT window control unit determines, based on a peak position information obtained from the OFDM signal in the frequency domain converted by the Fourier transform circuit and OFDM signals in preceding and subsequent symbols, whether or not the delay time detected by the delay amount detection unit is appropriate, and when the delay time is not appropriate, calculates an other delay time from the delay time, and sets a position of a time window, within the OFDM signal, indicating a range in which Fourier transform is to be performed by the Fourier transform circuit, using either of the delay time and the other delay time.

19. The OFDM receiver according to claim 4, wherein when the delay time is within the guard interval, the control determination unit controls the filter control unit so that filter characteristics correspond to a band that passes the main wave and the interference wave.

* * * * *